(12) United States Patent
Guo et al.

(10) Patent No.: US 9,129,630 B1
(45) Date of Patent: Sep. 8, 2015

(54) DATA STORAGE DEVICE EMPLOYING FULL SERVO SECTORS ON FIRST DISK SURFACE AND MINI SERVO SECTORS ON SECOND DISK SURFACE

(71) Applicant: Western Digital Technologies, Inc., Irvine, CA (US)

(72) Inventors: Wei Guo, Fremont, CA (US); Michael Chang, San Jose, CA (US); Yuan Chen, San Jose, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 14/571,521

(22) Filed: Dec. 16, 2014

(51) Int. Cl.
*G11B 5/54* (2006.01)
*G11B 5/596* (2006.01)
*G11B 5/49* (2006.01)

(52) U.S. Cl.
CPC .......... *G11B 5/59655* (2013.01); *G11B 5/4969* (2013.01)

(58) Field of Classification Search
CPC .............. G11B 5/4969; G11B 5/5578; G11B 2020/10916; G11B 2020/1232; G11B 5/5526; G11B 5/59633; G11B 5/5965; G11B 5/59655
USPC ............. 360/49, 55, 63, 64, 75, 77.05, 77.08, 360/78.14, 72.2
See application file for complete search history.

(56) References Cited

U.S. PATENT DOCUMENTS

| 4,638,384 | A | * | 1/1987 | Stewart et al. ............. 360/77.05 |
|---|---|---|---|---|
| 5,375,020 | A | | 12/1994 | Aggarwal et al. |
| 5,903,404 | A | * | 5/1999 | Tsurumi et al. ................. 360/48 |
| 6,014,283 | A | | 1/2000 | Codilian et al. |
| 6,052,076 | A | | 4/2000 | Patton, III et al. |
| 6,052,250 | A | | 4/2000 | Golowka et al. |
| 6,067,206 | A | | 5/2000 | Hull et al. |
| 6,078,453 | A | | 6/2000 | Dziallo et al. |
| 6,091,564 | A | | 7/2000 | Codilian et al. |
| 6,094,020 | A | | 7/2000 | Goretzki et al. |
| 6,101,065 | A | | 8/2000 | Alfred et al. |
| 6,104,153 | A | | 8/2000 | Codilian et al. |
| 6,122,133 | A | | 9/2000 | Nazarian et al. |
| 6,122,135 | A | | 9/2000 | Stich |
| 6,141,175 | A | | 10/2000 | Nazarian et al. |
| 6,160,368 | A | | 12/2000 | Plutowski |
| 6,181,502 | B1 | | 1/2001 | Hussein et al. |
| 6,195,222 | B1 | | 2/2001 | Heminger et al. |
| 6,198,584 | B1 | | 3/2001 | Codilian et al. |
| 6,198,590 | B1 | | 3/2001 | Codilian et al. |
| 6,204,988 | B1 | | 3/2001 | Codilian et al. |
| 6,243,223 | B1 | | 6/2001 | Elliott et al. |
| 6,281,652 | B1 | | 8/2001 | Ryan et al. |
| 6,285,521 | B1 | | 9/2001 | Hussein |
| 6,292,320 | B1 | | 9/2001 | Mason et al. |
| 6,310,742 | B1 | | 10/2001 | Nazarian et al. |

(Continued)

*Primary Examiner* — Thomas Alunkal

(57) ABSTRACT

A data storage device is disclosed comprising a first head actuated over a first disk surface comprising servo tracks defined by full servo sectors, and a second head actuated over a second disk surface comprising servo tracks defined by mini servo sectors. At least part of a track address is read from one of the full servo sectors to generate at least one high order bit of a full track address, and at least part of a track address is read from one of the mini servo sectors to generate at least one low order bit of the full track address. The high order bit and the low order bit are combined to generate at least part of the full track address, and during an access of the second disk surface, the second head is servoed over the second disk surface based on the full track address.

24 Claims, 5 Drawing Sheets

(56) References Cited

U.S. PATENT DOCUMENTS

| | | |
|---|---|---|
| 6,320,718 B1 | 11/2001 | Bouwkamp et al. |
| 6,342,984 B1 | 1/2002 | Hussein et al. |
| 6,345,021 B1 * | 2/2002 | Belser et al. ............... 369/47.1 |
| 6,347,018 B1 | 2/2002 | Kadlec et al. |
| 6,369,972 B1 | 4/2002 | Codilian et al. |
| 6,369,974 B1 | 4/2002 | Asgari et al. |
| 6,462,896 B1 | 10/2002 | Codilian et al. |
| 6,476,996 B1 | 11/2002 | Ryan |
| 6,484,577 B1 | 11/2002 | Bennett |
| 6,493,169 B1 | 12/2002 | Ferris et al. |
| 6,496,324 B1 | 12/2002 | Golowka et al. |
| 6,498,698 B1 | 12/2002 | Golowka et al. |
| 6,507,450 B1 | 1/2003 | Elliott |
| 6,534,936 B2 | 3/2003 | Messenger et al. |
| 6,538,839 B1 | 3/2003 | Ryan |
| 6,545,835 B1 | 4/2003 | Codilian et al. |
| 6,549,359 B1 | 4/2003 | Bennett et al. |
| 6,549,361 B1 | 4/2003 | Bennett et al. |
| 6,560,056 B1 | 5/2003 | Ryan |
| 6,568,268 B1 | 5/2003 | Bennett |
| 6,574,062 B1 | 6/2003 | Bennett et al. |
| 6,577,465 B1 | 6/2003 | Bennett et al. |
| 6,614,615 B1 | 9/2003 | Ju et al. |
| 6,614,618 B1 | 9/2003 | Sheh et al. |
| 6,636,377 B1 | 10/2003 | Yu et al. |
| 6,690,536 B1 | 2/2004 | Ryan |
| 6,693,764 B1 | 2/2004 | Sheh et al. |
| 6,707,635 B1 | 3/2004 | Codilian et al. |
| 6,710,953 B1 | 3/2004 | Vallis et al. |
| 6,710,966 B1 | 3/2004 | Codilian et al. |
| 6,714,371 B1 | 3/2004 | Codilian |
| 6,714,372 B1 | 3/2004 | Codilian et al. |
| 6,715,032 B1 | 3/2004 | Lee |
| 6,724,564 B1 | 4/2004 | Codilian et al. |
| 6,731,450 B1 | 5/2004 | Codilian et al. |
| 6,735,041 B1 | 5/2004 | Codilian et al. |
| 6,738,220 B1 | 5/2004 | Codilian |
| 6,747,837 B1 | 6/2004 | Bennett |
| 6,760,186 B1 | 7/2004 | Codilian et al. |
| 6,775,090 B2 * | 8/2004 | DuLaney et al. .......... 360/77.02 |
| 6,788,483 B1 | 9/2004 | Ferris et al. |
| 6,791,785 B1 | 9/2004 | Messenger et al. |
| 6,795,268 B1 | 9/2004 | Ryan |
| 6,798,594 B2 * | 9/2004 | Belser ........................ 360/53 |
| 6,819,518 B1 | 11/2004 | Melkote et al. |
| 6,826,006 B1 | 11/2004 | Melkote et al. |
| 6,826,007 B1 | 11/2004 | Patton, III |
| 6,847,502 B1 | 1/2005 | Codilian |
| 6,850,383 B1 | 2/2005 | Bennett |
| 6,850,384 B1 | 2/2005 | Bennett |
| 6,867,944 B1 | 3/2005 | Ryan |
| 6,876,508 B1 | 4/2005 | Patton, III et al. |
| 6,882,496 B1 | 4/2005 | Codilian et al. |
| 6,885,514 B1 | 4/2005 | Codilian et al. |
| 6,898,044 B1 | 5/2005 | Chheda |
| 6,900,958 B1 | 5/2005 | Yi et al. |
| 6,900,959 B1 | 5/2005 | Gardner et al. |
| 6,903,897 B1 | 6/2005 | Wang et al. |
| 6,914,740 B1 | 7/2005 | Tu et al. |
| 6,914,743 B1 | 7/2005 | Narayana et al. |
| 6,920,004 B1 | 7/2005 | Codilian et al. |
| 6,924,959 B1 | 8/2005 | Melkote et al. |
| 6,924,960 B1 | 8/2005 | Melkote et al. |
| 6,924,961 B1 | 8/2005 | Melkote et al. |
| 6,934,114 B1 | 8/2005 | Codilian et al. |
| 6,934,135 B1 | 8/2005 | Ryan |
| 6,937,420 B1 | 8/2005 | McNab et al. |
| 6,937,423 B1 | 8/2005 | Ngo et al. |
| 6,952,322 B1 | 10/2005 | Codilian et al. |
| 6,954,324 B1 | 10/2005 | Tu et al. |
| 6,958,881 B1 | 10/2005 | Codilian et al. |
| 6,963,465 B1 | 11/2005 | Melkote et al. |
| 6,965,488 B1 | 11/2005 | Bennett |
| 6,967,458 B1 | 11/2005 | Bennett et al. |
| 6,967,811 B1 | 11/2005 | Codilian et al. |
| 6,970,319 B1 | 11/2005 | Bennett et al. |
| 6,972,539 B1 | 12/2005 | Codilian et al. |
| 6,972,540 B1 | 12/2005 | Wang et al. |
| 6,972,922 B1 | 12/2005 | Subrahmanyam et al. |
| 6,975,480 B1 | 12/2005 | Codilian et al. |
| 6,977,789 B1 | 12/2005 | Cloke |
| 6,980,389 B1 | 12/2005 | Kupferman |
| 6,987,636 B1 | 1/2006 | Chue et al. |
| 6,987,639 B1 | 1/2006 | Yu |
| 6,989,954 B1 | 1/2006 | Lee et al. |
| 6,992,848 B1 | 1/2006 | Agarwal et al. |
| 6,992,851 B1 | 1/2006 | Cloke |
| 6,992,852 B1 | 1/2006 | Ying et al. |
| 6,995,941 B1 | 2/2006 | Miyamura et al. |
| 6,999,263 B1 | 2/2006 | Melkote et al. |
| 6,999,267 B1 | 2/2006 | Melkote et al. |
| 7,006,320 B1 | 2/2006 | Bennett et al. |
| 7,016,134 B1 | 3/2006 | Agarwal et al. |
| 7,023,637 B1 | 4/2006 | Kupferman |
| 7,023,640 B1 | 4/2006 | Codilian et al. |
| 7,027,256 B1 | 4/2006 | Subrahmanyam et al. |
| 7,027,257 B1 | 4/2006 | Kupferman |
| 7,035,026 B2 | 4/2006 | Codilian et al. |
| 7,046,465 B1 * | 5/2006 | Kupferman ................ 360/48 |
| 7,046,467 B1 | 5/2006 | Chheda |
| 7,046,472 B1 | 5/2006 | Melkote et al. |
| 7,050,249 B1 | 5/2006 | Chue et al. |
| 7,050,254 B1 | 5/2006 | Yu et al. |
| 7,050,258 B1 | 5/2006 | Codilian |
| 7,054,098 B1 | 5/2006 | Yu et al. |
| 7,061,714 B1 | 6/2006 | Yu |
| 7,064,918 B1 | 6/2006 | Codilian et al. |
| 7,068,451 B1 | 6/2006 | Wang et al. |
| 7,068,459 B1 | 6/2006 | Cloke et al. |
| 7,068,461 B1 | 6/2006 | Chue et al. |
| 7,068,463 B1 | 6/2006 | Ji et al. |
| 7,088,547 B1 | 8/2006 | Wang et al. |
| 7,095,579 B1 | 8/2006 | Ryan et al. |
| 7,110,208 B1 | 9/2006 | Miyamura et al. |
| 7,110,214 B1 | 9/2006 | Tu et al. |
| 7,113,362 B1 | 9/2006 | Lee et al. |
| 7,113,365 B1 | 9/2006 | Ryan et al. |
| 7,116,505 B1 | 10/2006 | Kupferman |
| 7,126,781 B1 | 10/2006 | Bennett |
| 7,158,329 B1 | 1/2007 | Ryan |
| 7,180,703 B1 | 2/2007 | Subrahmanyam et al. |
| 7,184,230 B1 | 2/2007 | Chue et al. |
| 7,196,864 B1 | 3/2007 | Yi et al. |
| 7,199,966 B1 | 4/2007 | Tu et al. |
| 7,203,021 B1 | 4/2007 | Ryan et al. |
| 7,209,321 B1 | 4/2007 | Bennett |
| 7,212,364 B1 | 5/2007 | Lee |
| 7,212,374 B1 | 5/2007 | Wang et al |
| 7,215,504 B1 | 5/2007 | Bennett |
| 7,224,546 B1 | 5/2007 | Orakcilar et al. |
| 7,248,426 B1 | 7/2007 | Weerasooriya et al. |
| 7,251,098 B1 | 7/2007 | Wang et al. |
| 7,253,582 B1 | 8/2007 | Ding et al. |
| 7,253,989 B1 | 8/2007 | Lau et al. |
| 7,265,933 B1 | 9/2007 | Phan et al. |
| 7,289,288 B1 | 10/2007 | Tu |
| 7,298,574 B1 | 11/2007 | Melkote et al. |
| 7,301,717 B1 | 11/2007 | Lee et al. |
| 7,304,819 B1 | 12/2007 | Melkote et al. |
| 7,330,019 B1 | 2/2008 | Bennett et al. |
| 7,330,327 B1 | 2/2008 | Chue et al. |
| 7,333,280 B1 | 2/2008 | Lifchits et al. |
| 7,333,290 B1 | 2/2008 | Kupferman |
| 7,339,761 B1 | 3/2008 | Tu et al. |
| 7,365,932 B1 | 4/2008 | Bennett |
| 7,388,728 B1 | 6/2008 | Chen et al. |
| 7,391,583 B1 | 6/2008 | Sheh et al. |
| 7,391,584 B1 | 6/2008 | Sheh et al. |
| 7,433,143 B1 | 10/2008 | Ying et al. |
| 7,440,210 B1 | 10/2008 | Lee |
| 7,440,225 B1 | 10/2008 | Chen et al. |
| 7,450,334 B1 | 11/2008 | Wang et al. |
| 7,450,336 B1 | 11/2008 | Wang et al. |
| 7,453,661 B1 | 11/2008 | Jang et al. |

(56) References Cited

U.S. PATENT DOCUMENTS

| | | |
|---|---|---|
| 7,457,071 B1 | 11/2008 | Sheh |
| 7,466,509 B1 | 12/2008 | Chen et al. |
| 7,468,855 B1 | 12/2008 | Weerasooriya et al. |
| 7,477,471 B1 | 1/2009 | Nemshick et al. |
| 7,480,116 B1 | 1/2009 | Bennett |
| 7,489,464 B1 | 2/2009 | McNab et al. |
| 7,492,546 B1 | 2/2009 | Miyamura |
| 7,495,857 B1 | 2/2009 | Bennett |
| 7,499,236 B1 | 3/2009 | Lee et al. |
| 7,502,192 B1 | 3/2009 | Wang et al. |
| 7,502,195 B1 | 3/2009 | Wu et al. |
| 7,502,197 B1 | 3/2009 | Chue |
| 7,505,223 B1 | 3/2009 | McCornack |
| 7,542,225 B1 | 6/2009 | Ding et al. |
| 7,548,392 B1 | 6/2009 | Desai et al. |
| 7,551,390 B1 | 6/2009 | Wang et al. |
| 7,558,016 B1 | 7/2009 | Le et al. |
| 7,573,670 B1 | 8/2009 | Ryan et al. |
| 7,576,941 B1 | 8/2009 | Chen et al. |
| 7,580,212 B1 | 8/2009 | Li et al. |
| 7,583,470 B1 | 9/2009 | Chen et al. |
| 7,595,954 B1 | 9/2009 | Chen et al. |
| 7,602,575 B1 | 10/2009 | Lifchits et al. |
| 7,616,399 B1 | 11/2009 | Chen et al. |
| 7,619,844 B1 | 11/2009 | Bennett |
| 7,626,782 B1 | 12/2009 | Yu et al. |
| 7,630,162 B2 | 12/2009 | Zhao et al. |
| 7,639,447 B1 | 12/2009 | Yu et al. |
| 7,656,604 B1 | 2/2010 | Liang et al. |
| 7,656,607 B1 | 2/2010 | Bennett |
| 7,660,067 B1 | 2/2010 | Ji et al. |
| 7,663,835 B1 | 2/2010 | Yu et al. |
| 7,675,707 B1 | 3/2010 | Liu et al. |
| 7,679,854 B1 | 3/2010 | Narayana et al. |
| 7,688,534 B1 | 3/2010 | McCornack |
| 7,688,538 B1 | 3/2010 | Chen et al. |
| 7,688,539 B1 | 3/2010 | Bryant et al. |
| 7,697,233 B1 | 4/2010 | Bennett et al. |
| 7,701,661 B1 | 4/2010 | Bennett |
| 7,710,676 B1 | 5/2010 | Chue |
| 7,715,138 B1 | 5/2010 | Kupferman |
| 7,724,464 B2 | 5/2010 | Kisaka et al. |
| 7,729,079 B1 | 6/2010 | Huber |
| 7,733,189 B1 | 6/2010 | Bennett |
| 7,746,592 B1 | 6/2010 | Liang et al. |
| 7,746,594 B1 | 6/2010 | Guo et al. |
| 7,746,595 B1 | 6/2010 | Guo et al. |
| 7,760,461 B1 | 7/2010 | Bennett |
| 7,800,853 B1 | 9/2010 | Guo et al. |
| 7,800,856 B1 | 9/2010 | Bennett et al. |
| 7,800,857 B1 | 9/2010 | Calaway et al. |
| 7,839,591 B1 | 11/2010 | Weerasooriya et al. |
| 7,839,595 B1 | 11/2010 | Chue et al. |
| 7,839,600 B1 | 11/2010 | Babinski et al. |
| 7,843,662 B1 | 11/2010 | Weerasooriya et al. |
| 7,852,588 B1 | 12/2010 | Ferris et al. |
| 7,852,592 B1 | 12/2010 | Liang et al. |
| 7,864,481 B1 | 1/2011 | Kon et al. |
| 7,864,482 B1 | 1/2011 | Babinski et al. |
| 7,869,155 B1 | 1/2011 | Wong |
| 7,876,522 B1 | 1/2011 | Calaway et al. |
| 7,876,523 B1 | 1/2011 | Panyavoravaj et al. |
| 7,916,415 B1 | 3/2011 | Chue |
| 7,916,416 B1 | 3/2011 | Guo et al. |
| 7,916,420 B1 | 3/2011 | McFadyen et al. |
| 7,916,422 B1 | 3/2011 | Guo et al. |
| 7,929,238 B1 | 4/2011 | Vasquez |
| 7,961,422 B1 | 6/2011 | Chen et al. |
| 8,000,053 B1 | 8/2011 | Anderson |
| 8,031,423 B1 | 10/2011 | Tsai et al. |
| 8,054,022 B1 | 11/2011 | Ryan et al. |
| 8,059,357 B1 | 11/2011 | Knigge et al. |
| 8,059,360 B1 | 11/2011 | Melkote et al. |
| 8,072,703 B1 | 12/2011 | Calaway et al. |
| 8,077,428 B1 | 12/2011 | Chen et al. |
| 8,078,901 B1 | 12/2011 | Meyer et al. |
| 8,081,395 B1 | 12/2011 | Ferris |
| 8,085,020 B1 | 12/2011 | Bennett |
| 8,116,023 B1 | 2/2012 | Kupferman |
| 8,145,934 B1 | 3/2012 | Ferris et al. |
| 8,179,626 B1 | 5/2012 | Ryan et al. |
| 8,189,286 B1 | 5/2012 | Chen et al. |
| 8,213,106 B1 | 7/2012 | Guo et al. |
| 8,254,222 B1 | 8/2012 | Tang |
| 8,300,348 B1 | 10/2012 | Liu et al. |
| 8,315,005 B1 | 11/2012 | Zou et al. |
| 8,320,069 B1 | 11/2012 | Knigge et al. |
| 8,351,174 B1 | 1/2013 | Gardner et al. |
| 8,358,114 B1 | 1/2013 | Ferris et al. |
| 8,358,145 B1 | 1/2013 | Ferris et al. |
| 8,390,367 B1 | 3/2013 | Bennett |
| 8,432,031 B1 | 4/2013 | Agness et al. |
| 8,432,629 B1 | 4/2013 | Rigney et al. |
| 8,451,697 B1 | 5/2013 | Rigney et al. |
| 8,482,873 B1 | 7/2013 | Chue et al. |
| 8,498,076 B1 | 7/2013 | Sheh et al. |
| 8,498,172 B1 | 7/2013 | Patton, III et al. |
| 8,508,881 B1 | 8/2013 | Babinski et al. |
| 8,531,798 B1 | 9/2013 | Xi et al. |
| 8,537,486 B2 | 9/2013 | Liang et al. |
| 8,542,455 B2 | 9/2013 | Huang et al. |
| 8,553,351 B1 | 10/2013 | Narayana et al. |
| 8,564,899 B2 | 10/2013 | Lou et al. |
| 8,576,506 B1 | 11/2013 | Wang et al. |
| 8,605,382 B1 | 12/2013 | Mallary et al. |
| 8,605,384 B1 | 12/2013 | Liu et al. |
| 8,610,391 B1 | 12/2013 | Yang et al. |
| 8,611,040 B1 | 12/2013 | Xi et al. |
| 8,619,385 B1 | 12/2013 | Guo et al. |
| 8,630,054 B2 | 1/2014 | Bennett et al. |
| 8,630,059 B1 | 1/2014 | Chen et al. |
| 8,634,154 B1 | 1/2014 | Rigney et al. |
| 8,634,283 B1 | 1/2014 | Rigney et al. |
| 8,643,976 B1 | 2/2014 | Wang et al. |
| 8,649,121 B1 | 2/2014 | Smith et al. |
| 8,654,466 B1 | 2/2014 | McFadyen |
| 8,654,467 B1 | 2/2014 | Wong et al. |
| 8,665,546 B1 | 3/2014 | Zhao et al. |
| 8,665,551 B1 | 3/2014 | Rigney et al. |
| 8,670,206 B1 | 3/2014 | Liang et al. |
| 8,687,312 B1 | 4/2014 | Liang |
| 8,693,123 B1 | 4/2014 | Guo et al. |
| 8,693,134 B1 | 4/2014 | Xi et al. |
| 8,699,173 B1 | 4/2014 | Kang et al. |
| 8,711,027 B1 | 4/2014 | Bennett |
| 8,711,506 B1* | 4/2014 | Giovenzana et al. ............ 360/51 |
| 8,717,696 B1 | 5/2014 | Ryan et al. |
| 8,717,699 B1 | 5/2014 | Ferris |
| 8,717,704 B1 | 5/2014 | Yu et al. |
| 8,724,245 B1 | 5/2014 | Smith et al. |
| 8,724,253 B1 | 5/2014 | Liang et al. |
| 8,724,524 B2 | 5/2014 | Urabe et al. |
| 8,737,008 B1 | 5/2014 | Watanabe et al. |
| 8,737,013 B2 | 5/2014 | Zhou et al. |
| 8,743,495 B1 | 6/2014 | Chen et al. |
| 8,743,503 B1 | 6/2014 | Tang et al. |
| 8,743,504 B1* | 6/2014 | Bryant et al. ............... 360/78.14 |
| 8,749,904 B1 | 6/2014 | Liang et al. |
| 8,760,796 B1 | 6/2014 | Lou et al. |
| 8,762,789 B2 | 6/2014 | Lund et al. |
| 8,767,332 B1 | 7/2014 | Chahwan et al. |
| 8,767,343 B1 | 7/2014 | Helmick et al. |
| 8,767,354 B1 | 7/2014 | Ferris et al. |
| 8,773,787 B1 | 7/2014 | Beker |
| 8,779,574 B1 | 7/2014 | Agness et al. |
| 8,780,473 B1 | 7/2014 | Zhao et al. |
| 8,780,477 B1 | 7/2014 | Guo et al. |
| 8,780,479 B1 | 7/2014 | Helmick et al. |
| 8,780,489 B1 | 7/2014 | Gayaka et al. |
| 8,792,202 B1 | 7/2014 | Wan et al. |
| 8,797,664 B1 | 8/2014 | Guo et al. |
| 8,804,267 B2 | 8/2014 | Huang et al. |
| 8,824,081 B1* | 9/2014 | Guo et al. ..................... 360/55 |
| 8,824,262 B1 | 9/2014 | Liu et al. |

(56) References Cited

U.S. PATENT DOCUMENTS

| | | | |
|---|---|---|---|
| 8,934,186 B1* | 1/2015 | Guo et al. | 360/48 |
| 2002/0141099 A1* | 10/2002 | Ng et al. | 360/75 |
| 2005/0078403 A1* | 4/2005 | Mizukoshi | 360/75 |
| 2006/0018051 A9 | 1/2006 | Chiao et al. | |
| 2010/0035085 A1 | 2/2010 | Jung et al. | |
| 2012/0284493 A1 | 11/2012 | Lou et al. | |
| 2013/0120870 A1 | 5/2013 | Zhou et al. | |
| 2013/0148240 A1 | 6/2013 | Ferris et al. | |

* cited by examiner

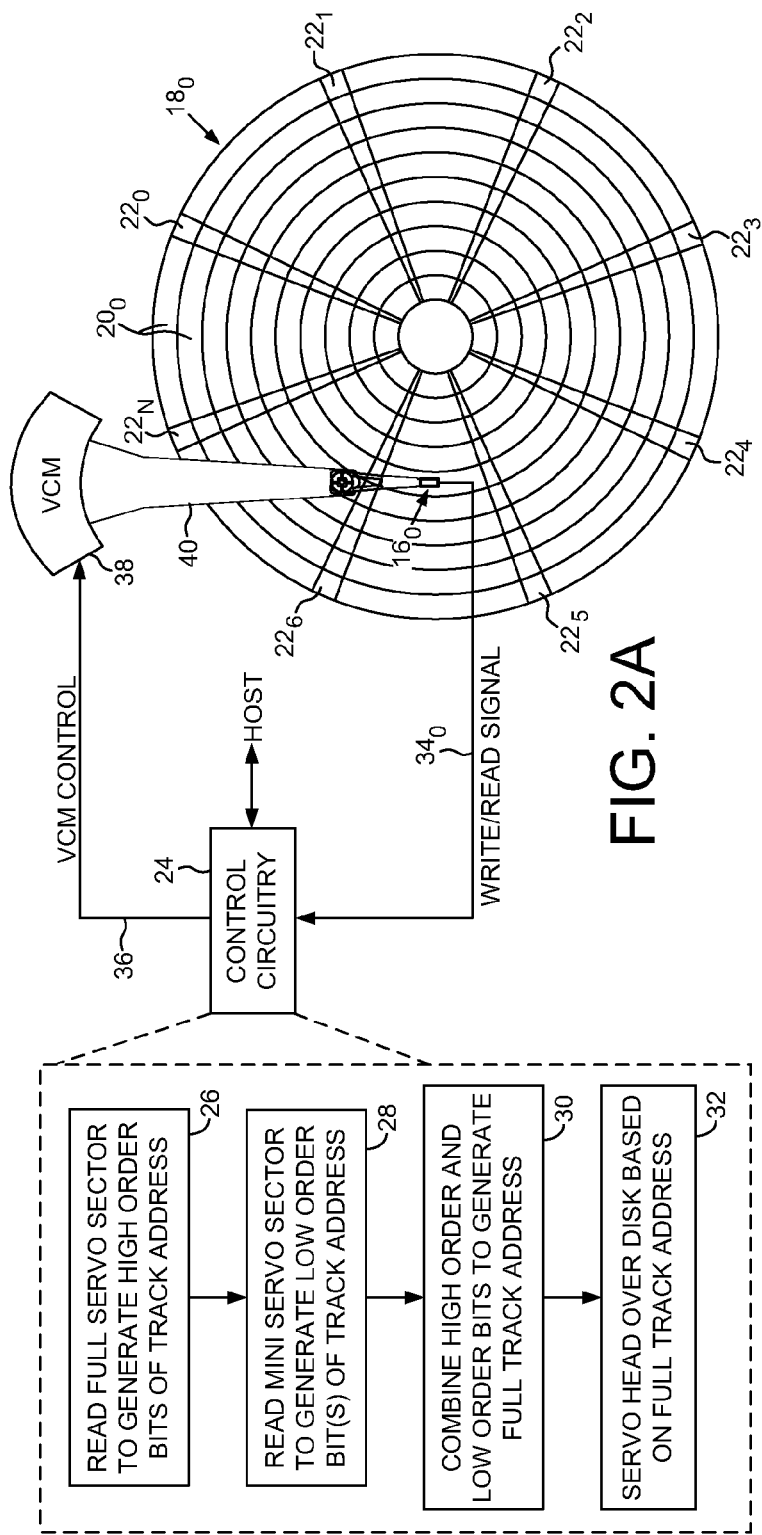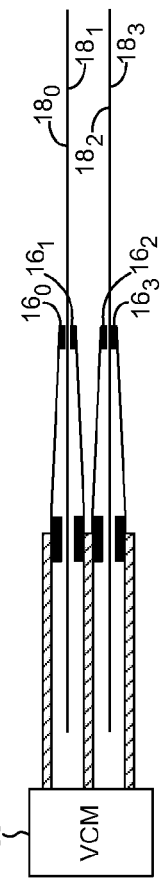
FIG. 2A
FIG. 2B
FIG. 2C

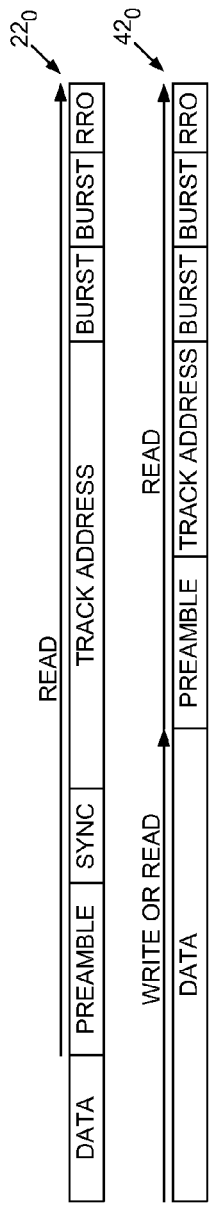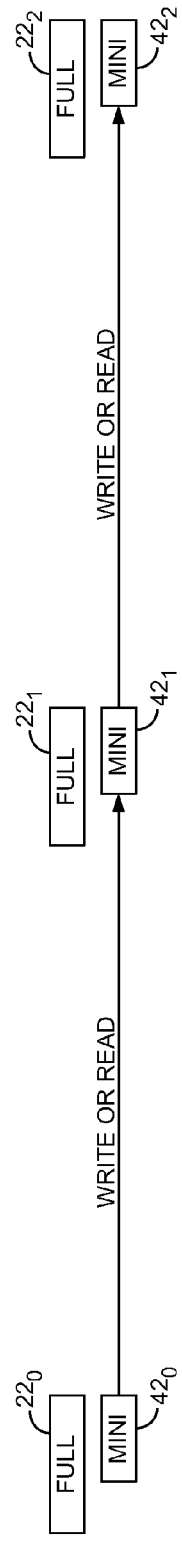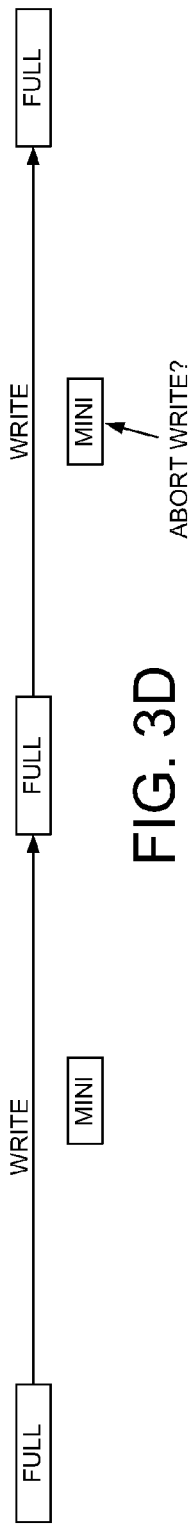
FIG. 3A
FIG. 3B
FIG. 3C
FIG. 3D

US 9,129,630 B1

DATA STORAGE DEVICE EMPLOYING FULL SERVO SECTORS ON FIRST DISK SURFACE AND MINI SERVO SECTORS ON SECOND DISK SURFACE

BACKGROUND

Data storage devices such as disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo sectors. The servo sectors comprise head positioning information (e.g., a track address) which is read by the head and processed by a servo control system to control the actuator arm as it seeks from track to track.

FIG. 1 shows a prior art disk format 2 as comprising a number of servo tracks 4 defined by servo sectors $6_0$-$6_N$ recorded around the circumference of each servo track. Each servo sector $6_i$ comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a servo track address, used to position the head over a target data track during a seek operation. Each servo sector $6_i$ further comprises groups of servo bursts 14 (e.g., N and Q servo bursts), which are recorded with a predetermined phase relative to one another and relative to the servo track centerlines. The phase-based servo bursts 14 provide fine head position information used for centerline tracking while accessing a data track during write/read operations. A position error signal (PES) is generated by reading the servo bursts 14, wherein the PES represents a measured position of the head relative to a centerline of a target servo track. A servo controller processes the PES to generate a control signal applied to a head actuator (e.g., a voice coil motor) in order to actuate the head radially over the disk in a direction that reduces the PES.

BRIEF DESCRIPTION OF THE DRAWINGS

FIGS. 2A and 2B show a data storage device in the form of a disk drive according to an embodiment comprising a first head actuated over a first disk surface comprising full servo sectors, and a second head actuated over a second disk surface comprising mini servo sectors.

FIG. 2C is a flow diagram according to an embodiment wherein when accessing the second disk surface a high order bit of a full track address is read from a full servo sector on the first disk surface and a low order bit of the full track address is read from a mini servo sector on the second disk surface.

FIG. 3A shows an embodiment wherein the full servo sectors on the first disk surface and the mini servo sectors on the second disk surface are bank written to be phase coherent.

FIG. 3B shows an embodiment wherein the mini servo sectors are shorter than the full servo sectors which increases the capacity of the second disk surface.

FIG. 3C shows an embodiment wherein the full servo sectors on the first disk surface are offset circumferentially from the mini servo sectors on the second disk surface.

FIG. 3D shows an embodiment wherein a write operation to the first disk surface may be aborted based on reading a mini servo sector from the second disk surface.

DETAILED DESCRIPTION

Figure 1:
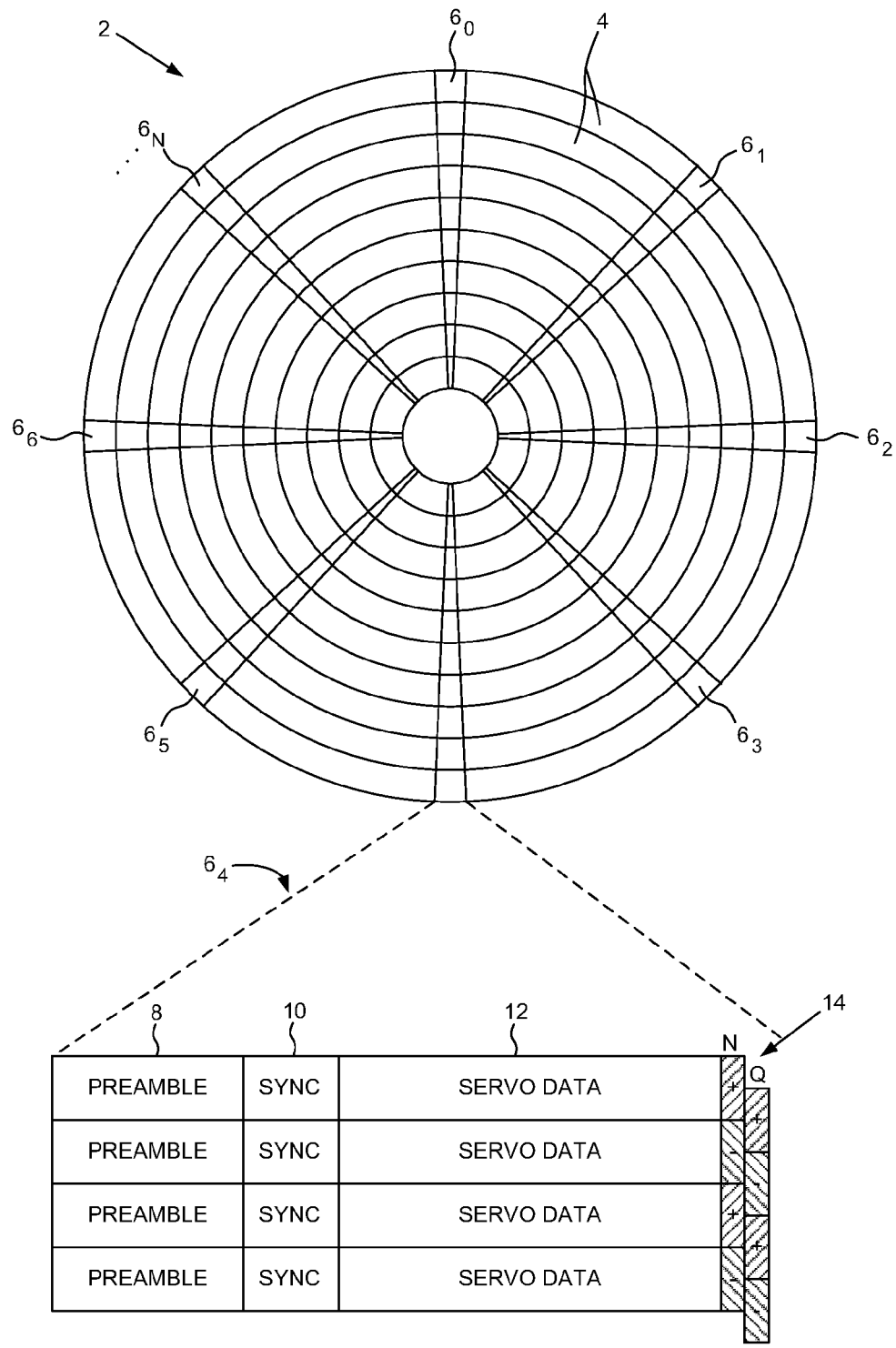
FIG. 1 shows a prior art disk format comprising a plurality of servo tracks defined by servo sectors.

FIGS. 2A and 2B show a data storage device in the form of a disk drive comprising a first head $16_0$ actuated over a first disk surface $18_0$ comprising servo tracks $20_0$ defined by full servo sectors $22_0$-$22_N$ each comprising a track address comprising a first number of bits, and a second head $16_1$ actuated over a second disk surface $18_1$ comprising servo tracks defined by mini servo sectors each comprising a track address comprising a second number of bits less than the first number. The disk drive further comprises control circuitry 24 configured to execute the flow diagram of FIG. 2C, wherein at least part of a track address is read from one of the full servo sectors to generate at least one high order bit of a full track address (block 26), and at least part of a track address is read from one of the mini servo sectors to generate at least one low order bit of the full track address (block 28). The high order bit and the low order bit are combined to generate at least part of the full track address (block 30), and during an access of the second disk surface, the second head is servoed over the second disk surface based on the full track address (block 32).

In the embodiment of FIG. 2A, the control circuitry 24 processes a read signal emanating from the first and second heads (e.g., read signal $34_0$ emanating from the first head $16_0$) in order to demodulate the servo sectors into a position error signal (PES) representing a difference between a measured radial location and a target radial location of a target head. The control circuitry 24 filters the PES using a suitable servo compensator to generate a control signal 36 applied to a voice coil motor (VCM) 38 which rotates an actuator arm 40 about a pivot in order to actuate the target head radially over the disk in a direction that reduces the PES. In one embodiment, the control circuitry 24 may also generate a control signal applied to at least one microactuator configured to actuate at least one of the heads over a respective disk surface in fine movements. In one embodiment, the control circuitry 24 may generate the control signals so as to actuate only the target head over the target disk surface, and in another embodiment, the control circuitry 24 may actuate two or more of the heads over their respective disk surfaces based on the servo information read from the servo sectors. For example, in one embodiment when accessing the second disk surface the control circuitry 24 may generate the control signal 36 applied to the VCM 38 based on the servo sectors read from the first disk surface, and generate a control signal applied to a microactuator based on the servo sectors read from the second disk surface, or vise versa. In yet another embodiment, the control circuitry 24 may generate the control signal 36 applied to the VCM 38 based on the servo sectors read from both disk surfaces, and generate a control signal applied to respective microactuators for each head based on the servo sectors read from the respective disk surfaces. Any suitable microactuator may be employed in the embodiments, such as a piezoelectric microactuator. In addition, the microactuator may actuate a head in any suitable manner, such as by actuating a gimbal relative to a suspension, or actuating a suspension relative to the actuator arm.

FIGS. 3A and 3B show an embodiment wherein the full servo sectors $22_0$-$22_N$ and the mini servo sectors $42_0$-$42_N$ may be bank written during a servo writing process so that they are phase coherent meaning that the magnetic transitions in the servo sectors are written concurrently. In this manner, when reading the full servo sectors $22_0$-$22_N$ from the first disk surface, the control circuitry 24 may phase synchronize to the preamble of a full servo sector, and then byte synchronize to the remaining servo data by reading a sync mark recorded in the full servo sector. In this embodiment, the control circuitry 24 may byte synchronize to the mini servo sectors $42_0$-$42_N$ on the second disk surface based on synchronizing to the full servo sectors $22_0$-$22_N$ on the first disk surface, and therefore in this embodiment the mini servo sectors $42_0$-$42_N$ may be written without a sync mark as shown in FIG. 3A. In one embodiment the mini servo sectors $42_0$-$42_N$ on the second disk surface may include a preamble to facilitate phase synchronizing to the mini servo sectors $42_0$-$42_N$; however, in one embodiment the preamble may be shorter than that recorded in the full servo sectors $22_0$-$22_N$ since the full servo sectors $22_0$-$22_N$ may facilitate at least partially phase synchronizing to the mini servo sectors $42_0$-$42_N$. In one embodiment, the mini servo sectors $42_0$-$42_N$ may include a sync mark that may be the same length or shorter than the sync mark recorded in the full servo sectors $22_0$-$22_N$.

FIGS. 3A and 3B also illustrate that in some embodiments, the mini servo sectors $42_0$-$42_N$ are shorter than the full servo sectors $22_0$-$22_N$ due, for example, to having a shorter track address, omitting a sync mark, decreasing the length of the preamble, etc. In one embodiment, the control circuitry 24 may be configured to access (write or read) the data sectors preceding the mini servo sectors $42_0$-$42_N$ on the second disk surface while concurrently reading the full servo sectors $22_0$-$22_N$ on the first disk surface. This embodiment increases the capacity of the second disk surface since less area is consumed by the mini servo sectors as compared to the full servo sectors. In the embodiment shown in FIG. 3B when the full servo sectors and mini servo sectors are bank written to be phase coherent, the control circuitry 24 may comprise a data read channel configured to access (write or read) a data sector preceding a mini servo sector on the second disk surface, as well as a first servo read channel configured to concurrently read the full servo sectors on the first disk surface. When the second head reaches the mini servo sector, a second servo read channel in the control circuitry 24 operates concurrently with the first servo read channel in order to concurrently read and demodulate both the full servo sector and the mini servo sector.

FIG. 3C illustrates another embodiment wherein the full servo sectors on the first disk surface are offset circumferentially from the mini servo sectors on the second disk surface. In this embodiment, the mini servo sectors on the second disk surface may include a servo sync mark since the mini servo sectors are not bank written with the full servo sectors on the first disk surface. However, this embodiment may provide other advantages, such as employing a single servo read channel to read and demodulate both the full servo sectors on the first disk surface, as well as the mini servo sectors on the second disk surface during a revolution of the disk. For example, when accessing (writing or reading) a data track on the second disk surface as illustrated in FIG. 3C, a data read channel may be configured to access the data track while a servo read channel may be configured to read and demodulate a full servo sector on the first disk surface. When the second head reaches a mini servo sector on the second disk surface, the same servo read channel may be configured to read and demodulate the mini servo sector, thereby reducing the cost and complexity of the control circuitry 24.

In another embodiment, recording the full and mini servo sectors in an interleaved manner such as shown in FIGS. 3C and 3D may increase the servo sample rate of the servo control system when accessing either the first or second disk surface. For example, when seeking to and/or when accessing a data track on the second disk surface as shown in FIG. 3C, the full servo sectors on the first disk surface may be processed to update the control signal applied to an actuator (VCM and/or microactuator) which effectively doubles the servo sample rate as compared to the embodiment of FIG. 3B. In another embodiment, the control circuitry 24 may process a full servo sector in order to abort a write operation to the second disk surface. That is, the position information derived from the full servo sector may indicate the second head has deviated from the data track between the mini servo sectors on the second disk surface, and therefore the full servo sectors may enable an earlier write abort to prevent an off-track write condition. FIG. 3D illustrates a similar embodiment wherein when the control circuitry is executing a write operation to the first disk surface, the mini servo sectors on the second disk surface may be processed to update the control signal applied to the actuator and/or to abort the write operation when a mini servo sector indicates an off-track condition. In one embodiment, the control circuitry 24 may measure a radial offset between the first and second heads which is taken into account when updating the control signal applied to the actuator and/or when aborting a write operation in response to an interim servo sector read from a disk surface not being accessed.

Figure 3E:
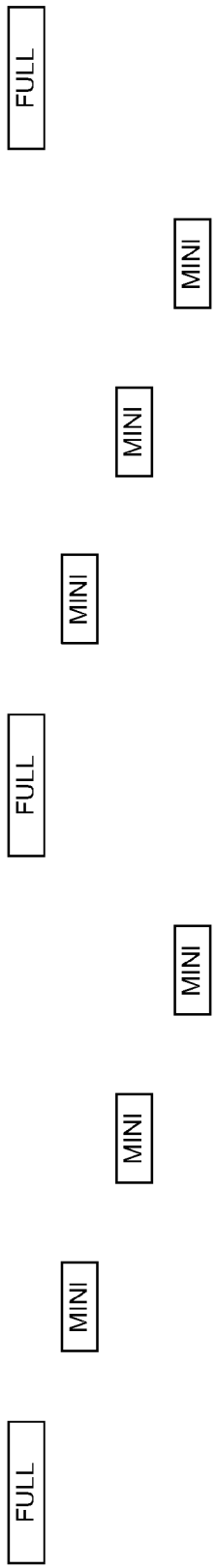
FIG. 3E shows an embodiment wherein the full servo sectors on a first disk surface and the mini servo sectors on other disk surfaces are staggered in order to increase the servo sample rate.
Figure 3F:
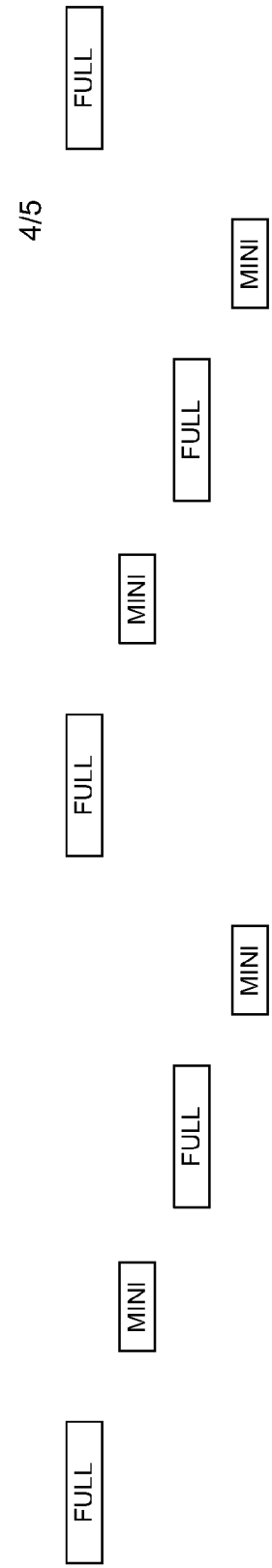
FIG. 3F shows an embodiment wherein the full servo sectors on a first disk surface and a second disk surface and the mini servo sectors on other disk surfaces are staggered in order to increase the servo sample rate.

FIG. 3E shows an embodiment wherein the full servo sectors on a first disk surface and the mini servo sectors on other disk surfaces are staggered in order to increase the servo sample rate. FIG. 3F shows an embodiment wherein the full servo sectors on a first disk surface and a second disk surface and the mini servo sectors on other disk surfaces are staggered in order to increase the servo sample rate. Increasing the servo sample rate may improve the accuracy when servoing any one of the heads over the respective disk surface, and/or may help detect an off-track condition sooner during a write operation to any of the disk surfaces.

Figure 4:
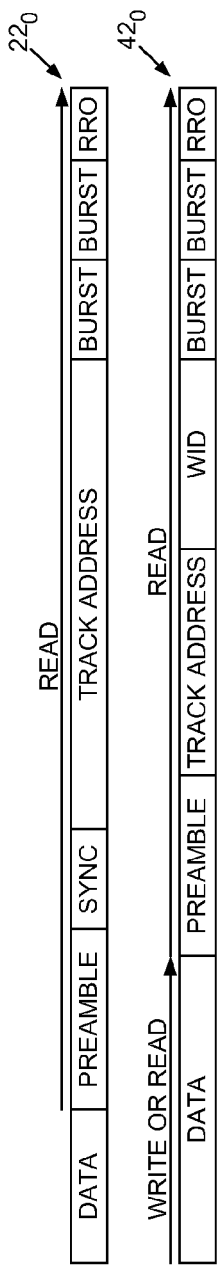
FIG. 4 shows an embodiment wherein the mini servo sectors on the second disk surface may comprise one or more fields, such as a wedge ID, not included in the full servo sectors on the first disk surface.

FIG. 4 shows an embodiment wherein the mini servo sectors on the second disk surface may comprise a servo field not included in the full servo sectors on the first disk surface in order to shorten the length of the full servo sectors. For example, in the embodiment of FIG. 4 each mini servo sector may comprise a wedge ID (WID) that identifies the sequence of servo sectors around the circumference of the disk (the sequence for both the full and mini servo sectors). That is, the WID may be processed by the control circuitry 24 to verify the proper circumferential location of the head during access operations. In another embodiment, a repeatable runout (RRO) field that may be included at the end of a full servo sector such as shown in FIG. 4 may instead be written to the end of the mini servo sector in addition to the RRO field for the mini servo sector. For example, the RRO field for a full servo sector may be read from a mini servo sector on the second disk surface when accessing the first disk surface in order to generate the appropriate compensation for the actuator control signal (e.g., feed-forward or feedback compensation). Accordingly, these embodiments may shorten the length of the full servo sectors in order to increase the capacity of the first disk surface. In one embodiment, the full and mini servo sectors may be approximately the same length even though the track address in a mini servo sector may be shorter than the track address in a full servo sector. In these embodiments, the capacity of the disk surfaces is increased as compared to the conventional technique of recording a full track address in the servo sectors of each disk surface.

Figure 5:
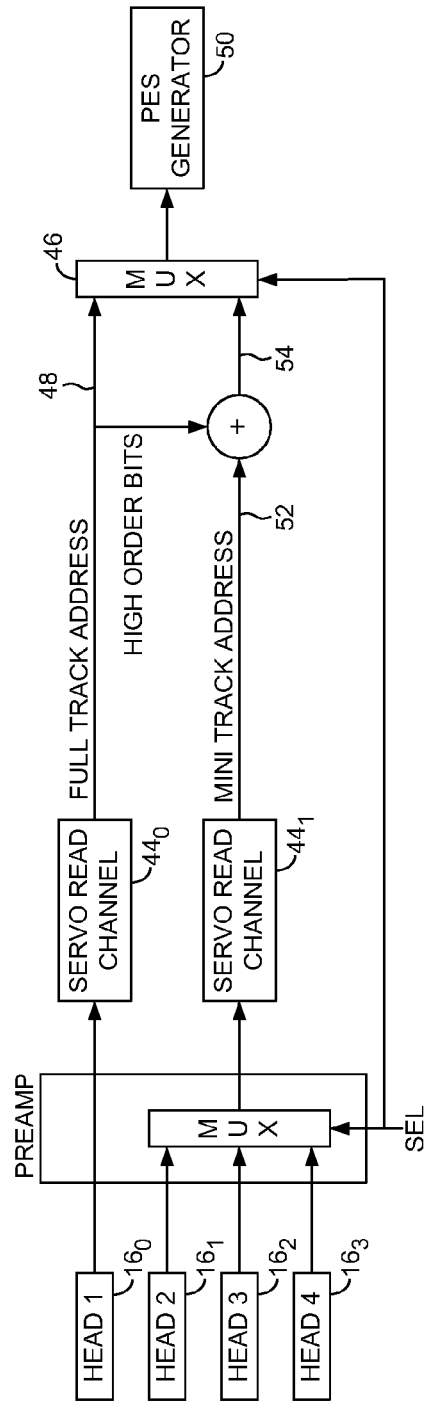
FIG. 5 shows an embodiment wherein a full servo sector on the first disk surface is read while concurrently reading a mini servo sector on the second disk surface using respective servo read channels.

FIG. 5 shows control circuitry 24 according to an embodiment comprising at least a first servo read channel $44_0$ configured to process the read signal emanating from a first head over a first disk surface, and a second servo read channel $44_1$ configured to concurrently process the read signal emanating from a second head over a second disk surface. In this embodiment, the track address in the full servo sectors on the first disk surface may comprise a full track address capable of uniquely identifying all of the servo tracks on the first disk surface, and the track address in the mini servo sectors on a second disk surface may comprise at least one low order bit of the full track address. When accessing the first disk surface, a multiplexer 46 is configured to apply the full track address 48 detected from a full servo sector to a PES generator 50. When accessing the second disk surface, a suitable number of high order bits of the full track address 48 read from a full servo sector are combined with a suitable number of the low order bit(s) of a mini track address 52 read from a mini servo sector in order to generate a full track address 54 applied to the PES generator 50 via the multiplexer 46.

In one embodiment, the number of bits in the track address of a mini servo sector (and the corresponding length of a mini servo sector) may depend on the tolerances between the full and mini servo sectors on the first and second disk surfaces. For example, the relative vibrations of the heads when writing the full and mini servo sectors may result in a varying radial offset between the heads (i.e., a varying radial offset between the full and mini servo sectors). In one embodiment, the control circuitry 24 may measure and take into account the fixed radial offset between the heads when generating the full track address; however, in one embodiment the variable radial offset between the full and mini servo sectors is compensated by the track address in the mini servo sectors. That is, the high order bits of the track address read from a full servo sector may provide a coarse radial position of the second head over the second disk surface, whereas the track address of the mini servo sector may provide a fine radial position of the second head over the second disk surface. Accordingly, in one embodiment the track address of the mini servo sectors may comprise as few as one bit or multiple bits depending on the measured and/or expected tolerances between the full and mini servo sectors.

In the example embodiment shown in FIG. 5, the first disk surface selected to record the full servo sectors corresponds to the top disk surface shown in FIG. 2B. However, any of the disk surfaces may be selected to record the full servo sectors and the multiplexers shown in FIG. 5 configured accordingly. In one embodiment, the relative fixed offset between all of the heads may be measured and used to determine the disk surface to record the full servo sectors. For example, in one embodiment the disk surface having the head with the median relative radial offset may be selected to record the full servo sectors so as to minimize the relative offset between the full servo sectors and the mini servo sectors. In another embodiment, the control circuitry 24 may execute a suitable test procedure to verify operability of the heads before configuring which disk surface to record the full servo sectors. For example, the control circuitry 24 may "depopulate" one or more of the heads due to inadequate operating performance prior to servo writing the disk surfaces, and therefore select the disk surface to record the full servo sectors based on the remaining good heads. In another embodiment, the control circuitry 24 may servo write multiple of the disk surfaces with full servo sectors for any suitable reason. For example, in one embodiment recording full servo sectors on multiple disk surfaces may reduce the relative radial offset between the heads, and thereby minimize the length of the track address in the mini servo sectors of the other disk surfaces. In another embodiment, recording full servo sectors on multiple disk surfaces may enable the control circuitry 24 to depopulate an underperforming head while deployed in the field by accessing full servo sectors of a different disk surface.

Any suitable control circuitry may be employed to implement the flow diagrams in the above embodiments, such as any suitable integrated circuit or circuits. For example, the control circuitry may be implemented within a read channel integrated circuit, or in a component separate from the read channel, such as a disk controller, or certain operations described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into a SOC.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

In various embodiments, a disk drive may include a magnetic disk drive, an optical disk drive, etc. In addition, while the above examples concern a disk drive, the various embodiments are not limited to a disk drive and can be applied to other data storage devices and systems, such as magnetic tape drives, solid state drives, hybrid drives, etc. In addition, some embodiments may include electronic devices such as computing devices, data server devices, media content storage devices, etc. that comprise the storage media and/or control circuitry as described above.

The various features and processes described above may be used independently of one another, or may be combined in various ways. All possible combinations and subcombinations are intended to fall within the scope of this disclosure. In addition, certain method, event or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the embodiments disclosed herein.

What is claimed is:

1. A data storage device comprising:
   a first disk surface comprising servo tracks defined by full servo sectors each comprising a track address comprising a first number of bits;
   a first head actuated over the first disk surface;
   a second disk surface comprising servo tracks defined by mini servo sectors each comprising a track address comprising a second number of bits less than the first number;
   a second head actuated over the second disk surface;
   control circuitry configured to:
      read at least part of the track address from one of the full servo sectors to generate at least one high order bit of a full track address;
      read at least part of the track address from one of the mini servo sectors to generate at least one low order bit of the full track address;
      combine the high order bit and the low order bit to generate at least part of the full track address; and
      during an access of the second disk surface, servo the second head over the second disk surface based on the full track address.

2. The data storage device as recited in claim 1, wherein the full servo sectors and the mini servo sectors are bank written to be phase coherent.

3. The data storage device as recited in claim 2, wherein:
   each full servo sector comprises a servo sync mark used to synchronize to the track address; and
   each mini servo sector does not comprise a servo sync mark.

4. The data storage device as recited in claim 2, wherein the control circuitry is further configured to concurrently read at least part of the track address from one of the full servo sectors while reading at least part of the track address from one of the mini servo sectors.

5. The data storage device as recited in claim 4, wherein the control circuitry is further configured to concurrently access the second disk surface while reading at least part of the track address from one of the full servo sectors on the first disk surface.

6. The data storage device as recited in claim 5, wherein accessing the second disk surface comprises writing data to the second disk surface.

7. The data storage device as recited in claim 5, wherein accessing the second disk surface comprises reading data from the second disk surface.

8. The data storage device as recited in claim 1, wherein the full servo sectors on the first disk surface are offset circumferentially from the mini servo sectors on the second disk surface.

9. The data storage device as recited in claim 8, wherein the control circuitry is further configured to concurrently access the second disk surface while reading at least part of the track address from one of the full servo sectors on the first disk surface.

10. The data storage device as recited in claim 8, wherein the control circuitry is further configured to concurrently access the first disk surface while reading at least part of the track address from one of the mini servo sectors on the second disk surface.

11. The data storage device as recited in claim 10, wherein during the access of the first disk surface the control circuitry is further configured to servo the first head over the first disk surface based at least in part on reading one of the mini servo sectors on the second disk surface.

12. The data storage device as recited in claim 10, wherein:
    the access of the first disk surface comprises writing to the first disk surface; and
    the control circuitry is further configured to abort the writing based on reading one of the mini servo sectors on the second disk surface.

13. A method of operating a data storage device, the method comprising:
    reading at least part of a track address from a full servo sector on a first disk surface to generate at least one high order bit of a full track address;
    reading at least part of a track address from a mini servo sector on a second disk surface to generate at least one low order bit of the full track address;
    combining the high order bit and the low order bit to generate at least part of the full track address; and
    during an access of the second disk surface, servoing a second head over the second disk surface based on the full track address.

14. The method as recited in claim 13, wherein the full servo sector and the mini servo sector are bank written to be phase coherent.

15. The method as recited in claim 14, wherein:
    the full servo sector comprises a servo sync mark used to synchronize to the track address; and
    the mini servo sector does not comprise a servo sync mark.

16. The method as recited in claim 14, further comprising concurrently reading at least part of the track address from the full servo sector while reading at least part of the track address from the mini servo sector.

17. The method as recited in claim 16, further comprising concurrently accessing the second disk surface while reading at least part of the track address from the full servo sector on the first disk surface.

18. The method as recited in claim 17, wherein accessing the second disk surface comprises writing data to the second disk surface.

19. The method as recited in claim 17, wherein accessing the second disk surface comprises reading data from the second disk surface.

20. The method as recited in claim 13, wherein the full servo sector on the first disk surface is offset circumferentially from the mini servo sector on the second disk surface.

21. The method as recited in claim 20, further comprising concurrently accessing the second disk surface while reading at least part of the track address from the full servo sector on the first disk surface.

22. The method as recited in claim 20, further comprising concurrently accessing the first disk surface while reading at least part of the track address from the mini servo sector on the second disk surface.

23. The method as recited in claim 22, wherein during the access of the first disk surface the method further comprises servoing a first head over the first disk surface based at least in part on reading the mini servo sector on the second disk surface.

24. The method as recited in claim 22, wherein:
the access of the first disk surface comprises writing to the first disk surface; and
the method further comprises aborting the writing based on reading the mini servo sector on the second disk surface.

* * * * *